2,972,566
PROCESS FOR THE PRODUCTION OF L-MALIC ACID

Kakuo Kitahara, Tokyo, Japan, assignor to Kyowa Hakko Kogyo Co., Ltd., Tokyo, Japan, a corporation of Japan No Drawing. Filed Dec. 7, 1959, Ser. No. 857,482

7 Claims. (Cl. 195—30)

This invention relates to a process for the biochemical production of L-malic acid from fumaric acid.

L-malic acid is used in the manufacture of jelly and as an acidulent for bottled beverages as well as an emulsifier for the manufacture of margarine and mayonnaise. In recent times various esters of L-malic acid have been found to be effective plasticizers. However, prior to the instant invention L-malic acid was prepared chiefly by extraction from natural substances at a high cost and therefore has not been manufactured on an industrial scale.

The main object of this invention is to provide the entire conversion of starting fumaric acid material into L-malic acid by utilizing fumarase contained in any organism. Although the reaction of fumaric acid with fumarase is reversible, it tends to proceed one-sidedly toward the formation of malic acid.

Fumarase can be obtained from animals, plants or micro-organisms, and its enzymatic reaction, as is heretofore known, may be represented by the following equation:

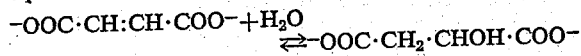

The above reversible reaction, when the molar ratio of fumaric acid to malic acid becomes roughly 1:3.3, will reach chemical equilibrium. At this stage the reaction is apparently substantially stopped. The indicated ratio is evidenced when the enzymatic reaction, using the water-soluble sodium salt, is conducted at a suitable temperature under a suitable pH. Theoretically the chemical equilibrium point between fumaric and malic acid may, of course, be changed to some extent by controlling the reaction conditions; or the unconverted fumaric acid material, recovered in a suitable manner from a malic acid-containing solution which has reached chemical equilibrium, can be reused as starting material. In commercial scale production, however, such procedures are very troublesome and difficult to practice.

In accordance with the present invention, almost all of the fumaric acid employed as starting material can be successfully converted into L-malic acid without any difficulty. The process of the present invention is schematically outlined as follows:

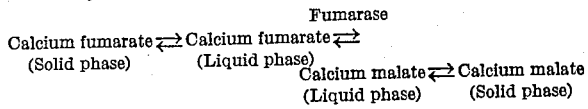

Thus the finding on which the present invention is based is that both the calcium salts of fumaric and malic acids are very scarcely soluble in water, and the latter is less soluble than the former. Upon experimentation, calcium salts of fumaric and malic acids have been found to have the respective solubilities in water of 1.3 gr./100 cc. and 0.8 gr./100 cc. Hereinbelow, the present invention will be explained in detail with reference to the above diagram.

To an aqueous solution in which calcium fumarate is suspended (or deposited), fumarase is added. The enzyme which acts on water-dissolved fumarate converts a portion thereof into calcium malate, which, due to lower solubility, crystallizes out from the system before the reaction has reached chemical equilibrium. Therefore, the above reaction continuously proceeds from left to right until not only solid calcium fumarate has completely disappeared but also the liquid phase calcium fumarate is reduced to such an extent that it is counterbalanced by the water-soluble portion of calcium malate (saturated solution). Thus the reaction is terminated at last. As is apparent from the above description, the reaction, in spite of the reversibility of fumarase, never proceeds from right to left.

After completing the reaction, the precipitated mass, which is pure calcium malate, is recovered. Then it is easily converted into the desired free L-malic acid by a suitable method (e.g. acid hydrolysis) which is well known to those skilled in the art. For example, the calcium malate is dissolved or suspended in water and is added a calculated amount of oxalic acid with agitation to precipitate a calcium oxalate; then the mixture is filtered to remove the precipitates; and the filtrate (malic acid solution) thus obtained is evaporated and dried so as to recover the malic acid.

While the foregoing explanation is given in a particular connection with calcium salts of fumaric and malic acids, the present invention resides in a process for the biochemical production of L-malic acid wherein a particular fumaric acid salt is utilized as starting material, the said fumaric acid salt being such that when its suspension undergoes the enzymatic activity of fumarase, it yields a malic acid salt which crystallizes out due to the low solubility before the malic acid salt reaches equilibrium with the liquid phase fumaric acid salt. Accordingly, the present invention involves, in addition to calcium fumarate, the use of such fumaric acid salts as defined above, e.g. magnesium fumarate, zinc fumarate, etc., as starting material.

Fumarase source which may be employed in a process of the invention can be obtained from any animals, plants and micro-organisms. Cells of *Lactobacillus brevis*, *Lactobacillus delbrueckii* or *Escherichia coli*, and the ground mass thereof are preferably used.

According to the present invention, the enzymatic reaction between fumaric acid salt and fumarase may be advantageously carried out at a temperature of from about 15° to 45° C. and at a pH of from about 5 to 8. The reaction period may vary within the range of from 16 hours to about 3 days, depending on the type of fumaric acid salt used.

The following example demonstrates a manner of carrying out the invention, but the invention is not to be construed as limited thereto.

In one hundred milliliters of water, 10 gr. (grams) of crystalline fumaric acid is suspended. While stirring the resulting suspension, calcium carbonate is added thereto portionwise to effect neutralization. A pH of 5.8 is obtained by adding about 9 gr. of calcium carbonate to said resulting suspension. When said pH is reached, a major portion of sparingly soluble calcium fumarate deposits as white colored, fine crystals.

Approximately 0.2 gr., on an anhydrous basis, of *Lactobacillus brevis* (a lactic acid bacteria which is previously cultivated in a equivolume mixture of nutrient bouillon and koji extract for about three days) cells is added to the separately prepared suspension. With gentle agitation, the suspension is kept at a temperature of 25° C. for a period of 20 hours. At the end of this period the reaction is terminated. The appearance of the suspension does not show any special change throughout the reaction with the exception that crystalline particles of the precipitate become slightly larger in size. Similar results are obtained when using magnesium fumarate and zinc fumarate.

The thus obtained precipitate (15.5 gr.) has a calcium fumarate content of less than 0.1 gr. That is, said precipitate is almost pure calcium L-malate, as clearly seen from the following experiment:

A definite amount of the precipitate is floated in water and then dissolved by adding a small amount of acetic acid. In determining the amount of L-malic acid in the above solution by measuring the specific rotation of the solution in the presence of uranyl acetate, it is found that the above-obtained precipitate corresponds to 10.45 gr. of L-malic acid. Separately calcium malate, prepared from authentic L-malic acid, is then identified as $$Ca(C_4H_4O_5)_2 \cdot H_2O$$

by evaluation from the content of water of crystallization. The theoretical amount calculated was 16.0 gr., which value was found to agree well with the experimental value of 15.5 gr. Since the theoretical yield of malic acid from 10 gr. of fumaric acid is 11.6 gr., the yield of this example is 90%. Since calcium L-malate (which corresponds to 0.6 gr. of L-malic acid) and calcium fumarate (which counterbalances 0.1 gr. of fumaric acid) remain in the solution, it is appreciated that the yield in the foregoing example is the highest possible.

A mixture of the calcium salts dissolved in the solution, after centrifuging the cells off, may be used as it is in the next batch, or the mixture may be mixed in fresh starting material after recovering the calcium salts by vaporization of the solution, whereby the troublesome and difficult operations for separation of fumaric and malic acids can be eliminated. Approximately 100° in practical yield is realized.

What is claimed is:

1. A process for the biochemical production of L-malic acid which comprises contacting an aqueous dispersion of a fumaric acid salt with fumarase, whereby the corresponding L-malic acid salt is formed, the cation of the fumaric acid salt being such that the solubility of L-malic acid salt is less than its quantity which equilibrates with the saturated solution of fumaric acid salt and therefore crystallizes out of solution before reaching an equilibrium state with liquid phase fumaric acid salt.

2. A process for the biochemical production of L-malic acid which comprises suspending a fumaric acid salt selected from the group consisting of calcium fumarate, magnesium fumarate and zinc fumarate in water and then subjecting the resulting suspension to the enzymatic activity of fumarase until a substantial amount of the corresponding malic acid salt is precipitated.

3. A process according to claim 2 wherein the fumarase is in the form of a member selected from the group consisting of cells of *Lactobacillus brevis* and a ground mass thereof.

4. A process according to claim 2 wherein the fumarase is in the form of a member selected from the group consisting of cells of *Lactobacillus delbrueckii* and a ground mass thereof.

5. A process according to claim 2 wherein the fumarase is in the form of a member selected from the group consisting of cells of *Escherichia coli* and a ground mass thereof.

6. A process according to claim 2, wherein the enzymatic reaction between fumarase and an aqueous solution of fumaric acid salt is carried out at a temperature of from about 15° to 45° C. and at a pH of from 5 to 8 for a period of 16 hours to 3 days.

7. A process for the biochemical production of L-malic acid which comprises suspending calcium fumarate in water, adding fumarase to the suspension, maintaining the suspension, while slowly stirring, at 25° C. for about 20 hours to effect approximately complete precipitation of calcium malate, and then hydrolyzing the thus formed calcium malate in acidic medium.

References Cited in the file of this patent

Scott et al.: Article in The Journal of The American Chemical Society, vol. 70, pp. 1104 to 1107, 1948.

Krebs: Article in The Biochemical Journal, vol. 54, pp. 78 to 82, published 1953, Cambridge University Press, London.